United States Patent
Islam et al.

(10) Patent No.: US 10,588,146 B2
(45) Date of Patent: Mar. 10, 2020

(54) SCHEDULING REQUEST COLLECTION THROUGH LICENSE-ASSISTED OPERATION

(71) Applicant: QUALCOMM Incorporated, San Diego, CA (US)

(72) Inventors: Muhammad Nazmul Islam, Edison, NJ (US); Tao Luo, San Diego, CA (US); Sundar Subramanian, Bridgewater, NJ (US); Bilal Sadiq, Basking Ridge, NJ (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 15/365,134

(22) Filed: Nov. 30, 2016

(65) Prior Publication Data

US 2017/0290047 A1  Oct. 5, 2017

Related U.S. Application Data

(60) Provisional application No. 62/318,711, filed on Apr. 5, 2016.

(51) Int. Cl.
  *H04W 88/06* (2009.01)
  *H04W 88/08* (2009.01)
  (Continued)

(52) U.S. Cl.
  CPC ....... *H04W 72/14* (2013.01); *H04W 72/0406* (2013.01); *H04W 72/1284* (2013.01);
  (Continued)

(58) Field of Classification Search
  CPC .. H04W 72/1284; H04W 28/24; H04W 72/10
  (Continued)

(56) References Cited

U.S. PATENT DOCUMENTS

| 8,374,076 B2 | 2/2013 | Kim et al. |
| 9,113,450 B2 | 8/2015 | Pelletier et al. |

(Continued)

FOREIGN PATENT DOCUMENTS

| EP | 2947804 A1 * | 11/2015 | ............ H04W 16/32 |
| EP | 2947804 A1 | 11/2015 | |
| WO | 2016053592 A1 | 4/2016 | |

OTHER PUBLICATIONS

International Search Report and Written Opinion—PCT/US2017/023866—ISA/EPO—Jun. 28, 2017.

*Primary Examiner* — Iqbal Zaidi
(74) *Attorney, Agent, or Firm* — Arent Fox LLP

(57) ABSTRACT

In an aspect of the disclosure, a method, a computer-readable medium, and an apparatus are provided. The apparatus may be configured to send, in a first network, a scheduling request (SR) associated with a second network. The apparatus may be further configured to receive an uplink grant based on the SR. The apparatus may be further configured to send, in the second network, uplink transmission based on the uplink grant. In an another aspect of the disclosure, a method, a computer-readable medium, and an apparatus are provided. The apparatus may be configured to receive, in a first network, a scheduling request (SR) associated with a user equipment (UE). The apparatus may be further configured to generate an uplink grant based on the SR. The apparatus may be further configured to send, in a second network, the uplink grant to the UE.

28 Claims, 10 Drawing Sheets

(51) Int. Cl.
*H04W 72/14* (2009.01)
*H04W 72/12* (2009.01)
*H04W 72/04* (2009.01)

(52) U.S. Cl.
CPC ...... *H04W 72/042* (2013.01); *H04W 72/0413* (2013.01); *H04W 72/1215* (2013.01); *H04W 88/06* (2013.01); *H04W 88/08* (2013.01)

(58) Field of Classification Search
USPC .................. 370/252–344; 375/260; 455/450
See application file for complete search history.

(56) References Cited

U.S. PATENT DOCUMENTS

| | | |
|---|---|---|
| 9,294,926 B2 | 3/2016 | Pragada et al. |
| 2012/0207040 A1 | 8/2012 | Comsa et al. |
| 2012/0320874 A1* | 12/2012 | Li ........................ H04W 48/12 370/331 |
| 2013/0242907 A1* | 9/2013 | Kang ................ H04W 72/0413 370/329 |
| 2015/0004918 A1 | 1/2015 | Wang et al. |
| 2015/0230235 A1 | 8/2015 | Uchino et al. |
| 2015/0341872 A1 | 11/2015 | Ryu et al. |
| 2016/0192433 A1 | 6/2016 | Deenoo et al. |
| 2018/0192389 A1* | 7/2018 | Li ........................ H04W 56/00 |

\* cited by examiner

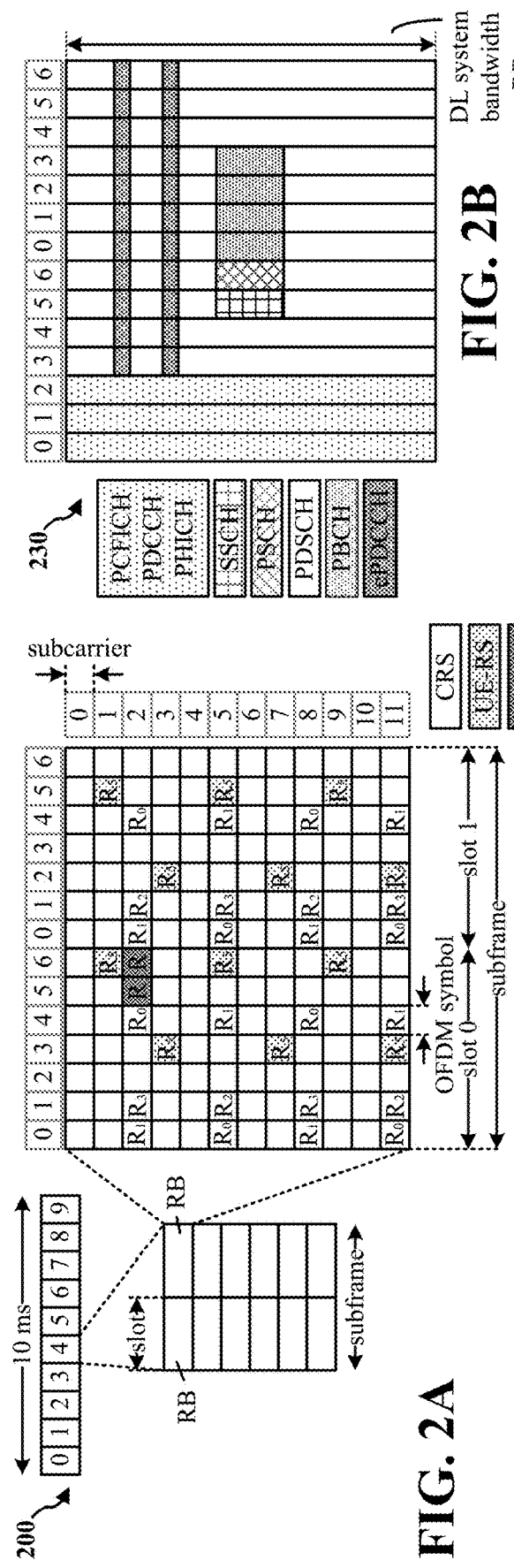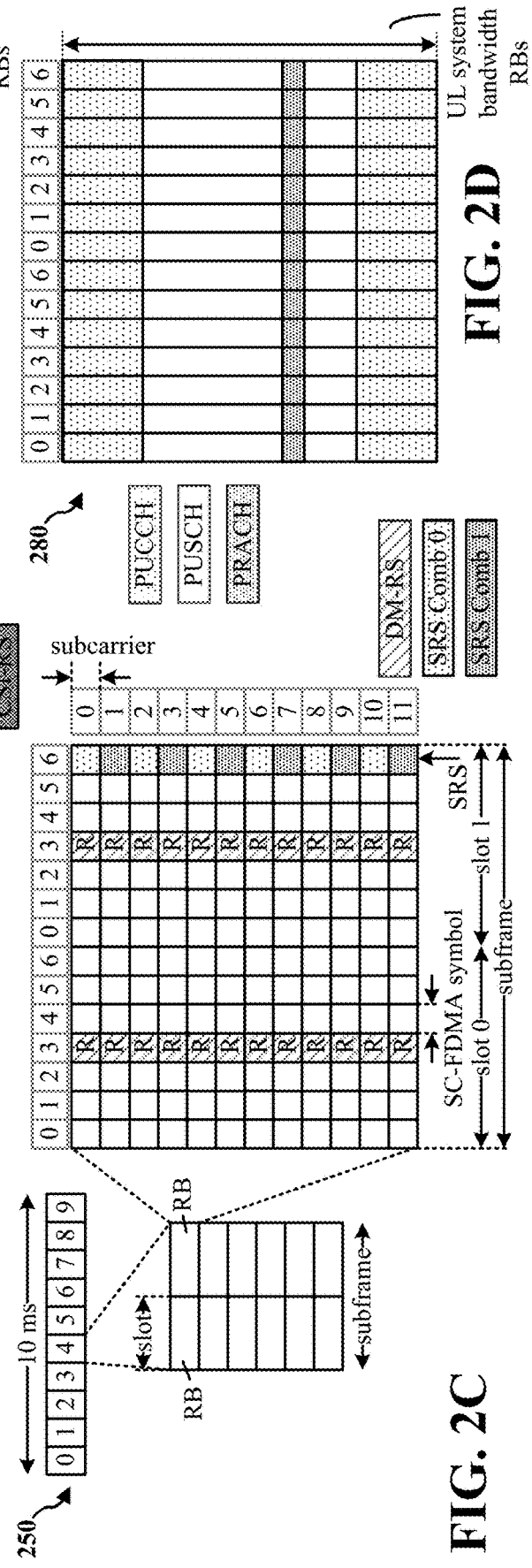

SCHEDULING REQUEST COLLECTION THROUGH LICENSE-ASSISTED OPERATION

CROSS-REFERENCE TO RELATED APPLICATION(S)

This application claims the benefit of U.S. Provisional Application Ser. No. 62/318,711, entitled "SR COLLECTION THROUGH LICENSE ASSISTED OPERATION" and filed on Apr. 5, 2016, which is expressly incorporated by reference herein in its entirety.

BACKGROUND

Field

The present disclosure relates generally to communication systems, and more particularly, to a scheduling request (SR) collection through a licensed radio access technology (RAT).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In millimeter-wave (mmW) systems, a physical uplink control channel (PUCCH) may be dynamically allocated to an active user equipment (UE). Some inactive UEs may need to send a scheduling request (SR) to a base station, but the inactive UEs may lack the resources in the PUCCH to transmit an SR. Such a UE, through previously inactive, may transmit an SR through a license-assisted mechanism. For example, a previously inactive UE may transmit an SR through a Long Term Evolution (LTE) radio access technology (RAT) or through another 5G system that operates in a spectrum sub-six (6) gigahertz (GHz).

In an aspect of the disclosure, a method, a computer-readable medium, and an apparatus are provided. The apparatus may be configured to send, in a first network, a scheduling request (SR) associated with a second network. The apparatus may be further configured to receive an uplink grant based on the SR. The apparatus may be further configured to send, in the second network, an uplink transmission based on the uplink grant.

In an another aspect of the disclosure, a method, a computer-readable medium, and an apparatus are provided. The apparatus may be configured to receive, in a first network, a scheduling request (SR) associated with a user equipment (UE). The apparatus may be further configured to generate an uplink grant based on the SR. The apparatus may be further configured to send, in a second network, the uplink grant to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
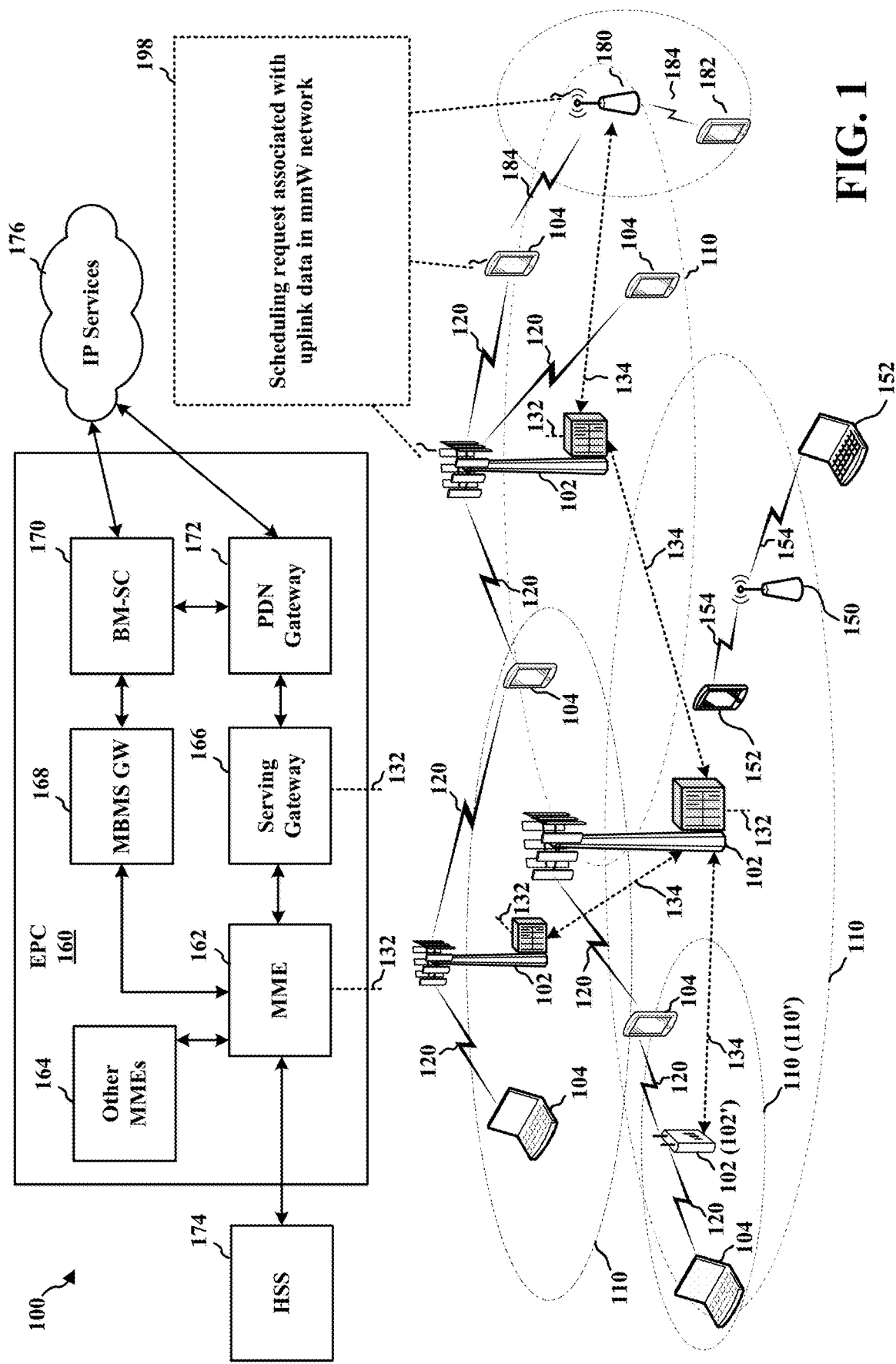
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The wireless communications system and an access network 100 may include a millimeter wave (mmW) base station 180. In one aspect, the mmW base station 180 may be integrated with a base station. The mmW base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit a scheduling request (SR) 198 to a base station 102. In aspects, the UE 104 may transmit the SR using a first RAT, such as LTE or a 5G RAT operating sub-six (6) gigahertz (GHz). In aspects, the SR may be associated with a millimeter-wave (mmW) system, which may be collocated with the base station 102 (e.g., the mmW base station 180).

The base station 102 (which may be collocated with the mmW base station 180) may be configured to generate an uplink grant based on the SR. The base station 102 may be configured to send, using the mmW system, the uplink grant to the UE 104. The UE 104 may then communicate in the mmW system based on the uplink grant, such as by communicating with the mmW base station 180.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
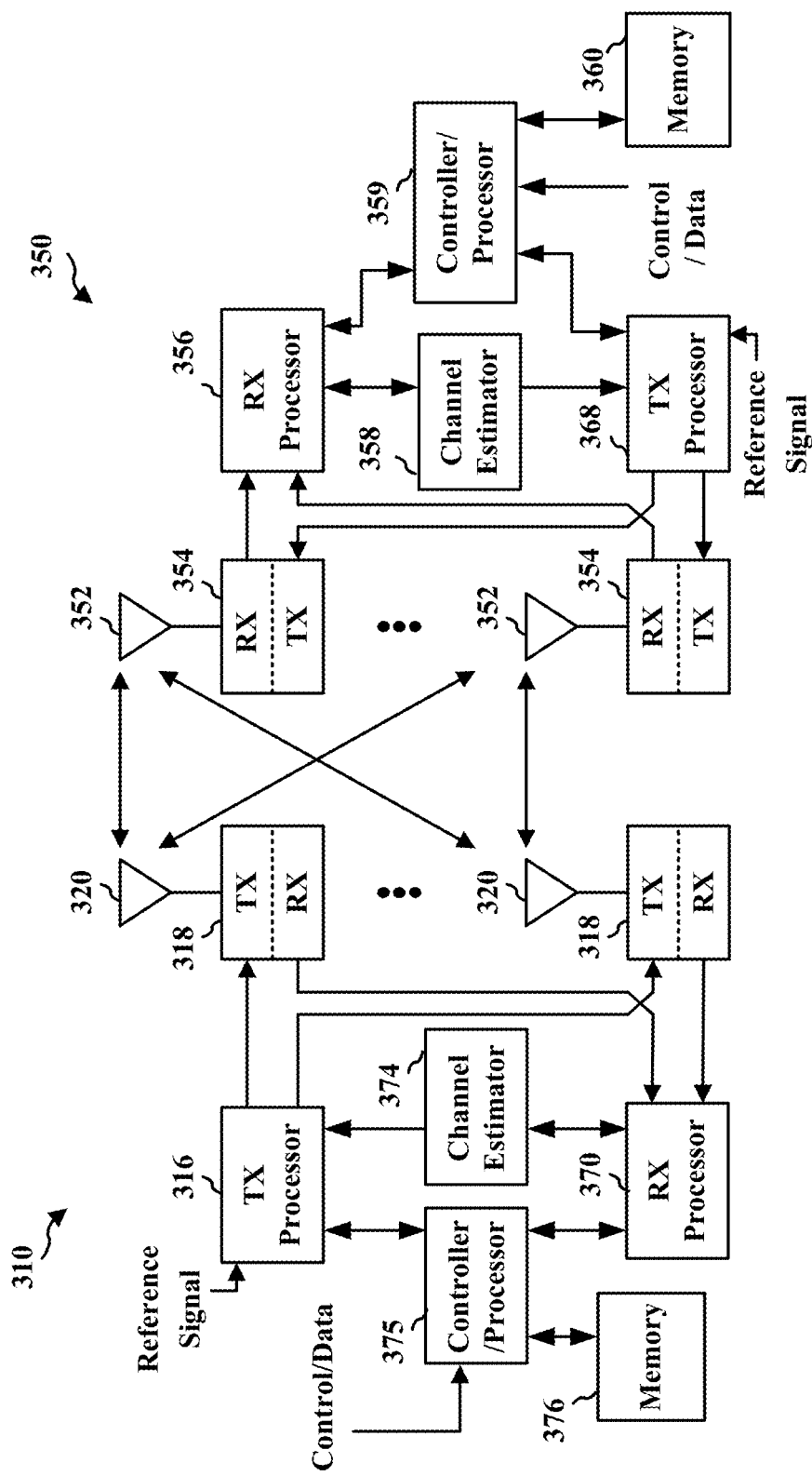
FIG. 3 is a diagram illustrating an example of a base station and user equipment (UE) in an access network.

FIG. 3 is a block diagram of a base station 310 in communication with a UE 350 in an access network. In one aspect, the base station 310 may be a base station providing a macro cell, such as an eNB. In another aspect, the base station 310 may be a mmW base station. In yet another aspect, the base station 310 may include a mmW base station that is integrated with another base station, such as a base station providing a macro cell. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave (mmW). Near mmW may extend down to a frequency of 3 GHz with a wavelength of 100 millimeters (the super high frequency (SHF) band extends between 3 GHz and 30 GHz, also referred to as centimeter wave). While the disclosure herein references mmWs, it should be understood that the disclosure also applies to near mmWs. Further, while the disclosure herein refers to mmW base stations, it should be understood that the disclosure also applies to near mmW base stations. The millimeter wavelength RF channel has extremely high path loss and a short range. In order to build a useful communication network in the millimeter wavelength spectrum, a beamforming technique may be used to compensate for the extreme high path loss. The beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of the UE movement or changes in the environment (e.g., obstacles, humidity, rain, etc.), the beam may not be able to reach the UE. The beamforming technique requires that the mmW base stations and the UEs transmit and receive in a direction that allows the most RF energy to be collected. Accordingly, without knowing the directions for the beamforming, a reliable link between the UEs and the mmW base stations cannot be made. Without a reliable link, UEs cannot discover the millimeter wavelength access network. In particular, without a reliable link, network parameter initialization, secure handshaking processes between the network and the UEs, and network state tracking processes cannot be performed.

Wireless-communication techniques and methods are provided infra with respect to uplink scheduling in assisted (e.g., LTE assisted) millimeter wavelength wireless access networks.

Figure 4:
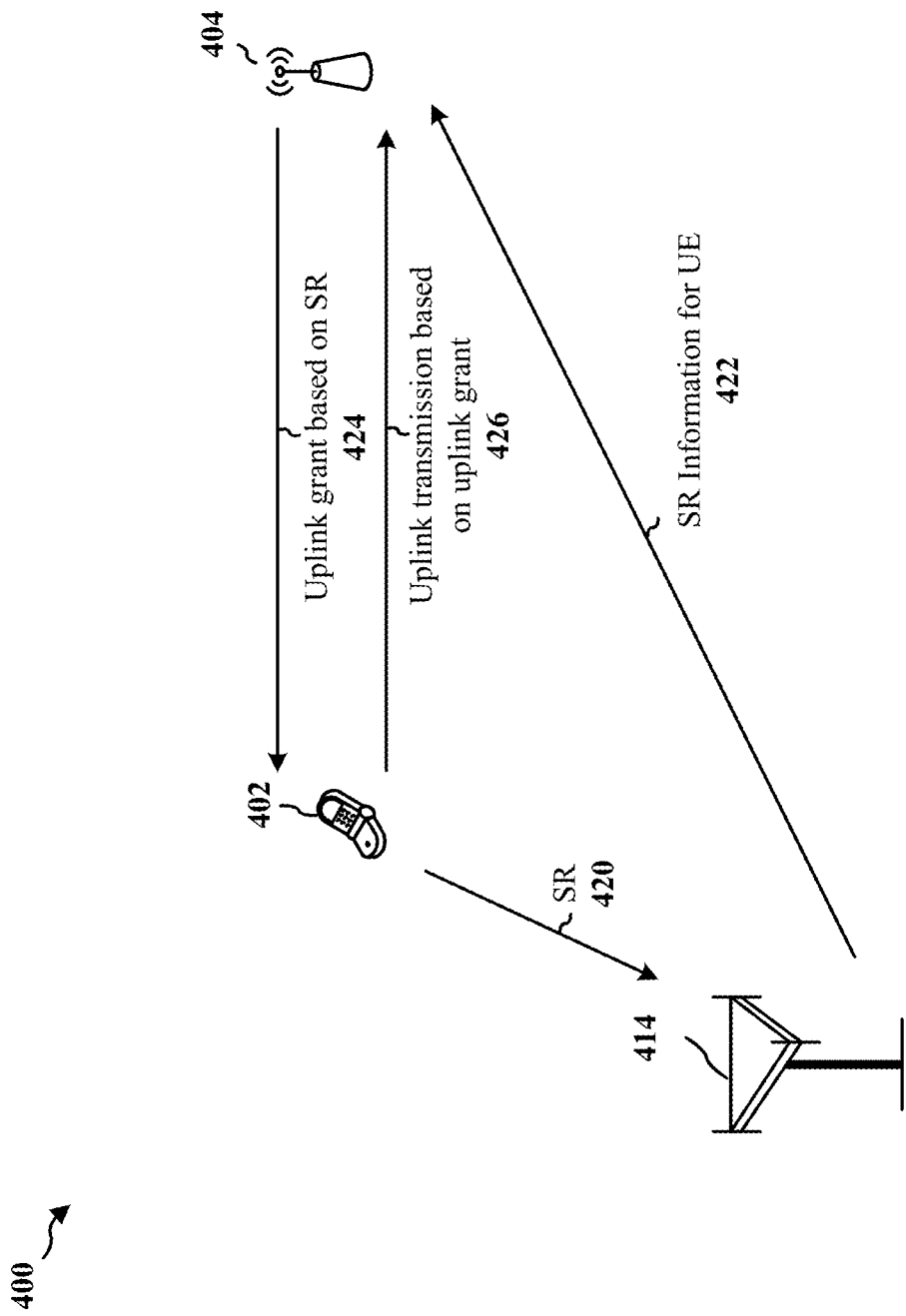
FIG. 4 is a diagram of a millimeter-wave communications system.

FIG. 4 is a diagram of a wireless communications system 400. The wireless communications system 400 may include at least a UE 402, a mmW base station 404, and a macro eNB 414. In one aspect, the mmW base station 404 and the macro eNB 414 may be collocated—e.g., the mmW base station 404 and the eNB 414 may be housed in a same device housing. According to one aspect, the eNB 414 may be associated with a first network, such as an LTE network or a fifth generation (5G) network that operates at sub-6 GHz. The mmW base station 404 may be associated with a second network that operates at a higher frequency than the first network, such as a mmW or near-mmW network.

Referring to FIG. 4, the UE 402 may discover the macro eNB 414. The UE 402 may perform a random access procedure with the eNB 414 and may camp on a cell associated with the macro eNB 414. Similarly, the UE 402 may discover the mmW base station 404. The UE 402 may perform a random access procedure with the mmW base station 404.

For the mmW system associated with the mmW base station 404, a PUCCH may be dynamically allocated to a UE. A PUCCH may be dynamically allocated to a UE when the UE is active (e.g., RRC Connected mode). In another aspect, a UE may need to send a scheduling request (SR). The SR may be used to request uplink shared channel resources for a new transmission. For example, a UE may need to send an SR to the mmW base station 404 when the UE 402 is inactive (e.g., RRC Idle mode, the UE 402 transitions from a discontinuous reception cycle (DRX) low-power state to a DRX high-power state, the UE 402 does not have an uplink grant, and the like). However, an inactive UE may lack the resources of the PUCCH to transmit an SR. In the context of FIG. 4, the UE 402 may lack resources of the PUCCH to transmit an SR to the mmW base station 404. Accordingly, the UE 402 may transmit an SR through a license-assisted mechanism, for example, when the UE 402 is inactive.

According to one aspect, the UE 402 may determine that the UE 402 has data to transmit to the mmW base station 404—e.g., the UE 402 may determine that the UE 402 has data to transmit to the mmW base station 404 based on higher layers of the UE 402 (e.g., application layer). That is, the UE 402 may determine that the UE 402 is to transmit an SR based on an uplink transmission that the UE 402 is to transmit.

In one aspect, the UE 402 may be inactive with respect to the mmW base station 404. For example, the UE 402 may perform the random access procedure with the mmW base station 404, but the UE 402 may not have an uplink transmission to transmit to the mmW base station 404 immediately following the random access procedure. In some aspects, the UE 402 may lack resources of the PUCCH to transmit an SR, for example, after a period of time following the random access procedure with the mmW base station 404 (e.g., the UE 402 may transition to a low-power DRX state, which may cause PUCCH resources to be reallocated from the UE 402 to a different UE). Thus, the UE 402 may determine that the UE 402 has an uplink transmission to transmit to the mmW base station 404 but lacks uplink control resources of the PUCCH on which to send the SR in order to receive an uplink grant for transmission of the uplink transmission.

The UE 402 may transmit an SR 420 through the first network to the eNB 414—e.g., the UE 402 may have resources of a PUCCH associated with the eNB 414 on which to send an SR. Therefore, the UE 402 may transmit an SR to the eNB 414 in the first network. However, the SR may be associated with an uplink grant in the second network. For example, the SR may indicate that the UE 402 is requesting resources (e.g., an uplink grant) in the second network (e.g., mmW network), even though the SR is transmitted through the first network.

The eNB 414 may receive the SR from the UE 402 in the first network. The eNB 414 may determine that the SR is not for an uplink grant in the first network and/or not for the eNB 414. Accordingly, the eNB 414 may provide information 422 associated with the SR for the UE 402 to the mmW base station 404. In one aspect, the eNB 414 may provide the information 422 associated with the SR to the mmW base station 404 in the first network. In another aspect, the eNB 414 may provide the information 422 associated with the SR to the mmW base station 404 in the second network. In another aspect, the eNB 414 may provide the information 422 associated with the SR to the mmW base station 404 over a different network, such as a wireline or backhaul network. In one aspect, the eNB 414 and the mmW base station 404 are collocated and, therefore, the information 422 associated with the SR may be provided to the mmW base station 404 via internal circuitry.

In response to the information 422, the mmW base station 404 may allocate or schedule resources for the UE 402 in the second network. The mmW base station 404 may generate a message indicating the uplink grant. The mmW base station 404 may transmit, in the second network, the uplink grant 424 to the UE 402 based on the SR information 422.

In an alternative aspect, the mmW base station 404 may provide the uplink grant 424 to the eNB 414 (e.g., in the first network or the second network). The eNB 414 may then transmit the uplink grant 424 to the UE 402 in the first network.

Based on the uplink grant 424, the UE 402 may transmit an uplink transmission 426 to the mmW base station 404 in the second network. For example, the UE 402 may transmit the uplink transmission 426 on resources indicates in the uplink grant 424. The UE 402 may then transmit the uplink transmission in the second network to the mmW base station 404 based on the uplink grant 424. The uplink transmission 426 may include any information, such as data and/or control information.

Although FIG. 4 illustrates the mmW base station 404 as a single transmission point, the present disclosure comprehends aspects in which the wireless communications system 400 includes a plurality of transmission points that are configured to provide mmW and/or near-mmW services. For example, the wireless communications system 400 may include several mmW base stations that are similar to the mmW base station 404. Accordingly, the present disclosure comprehends aspects in which a first transmission point (e.g., the mmW base station 404) receives the SR information 422, but the uplink transmission is sent by the UE 402 to a second transmission point (e.g., a mmW base station similar to the mmW base station 404).

Figure 5:
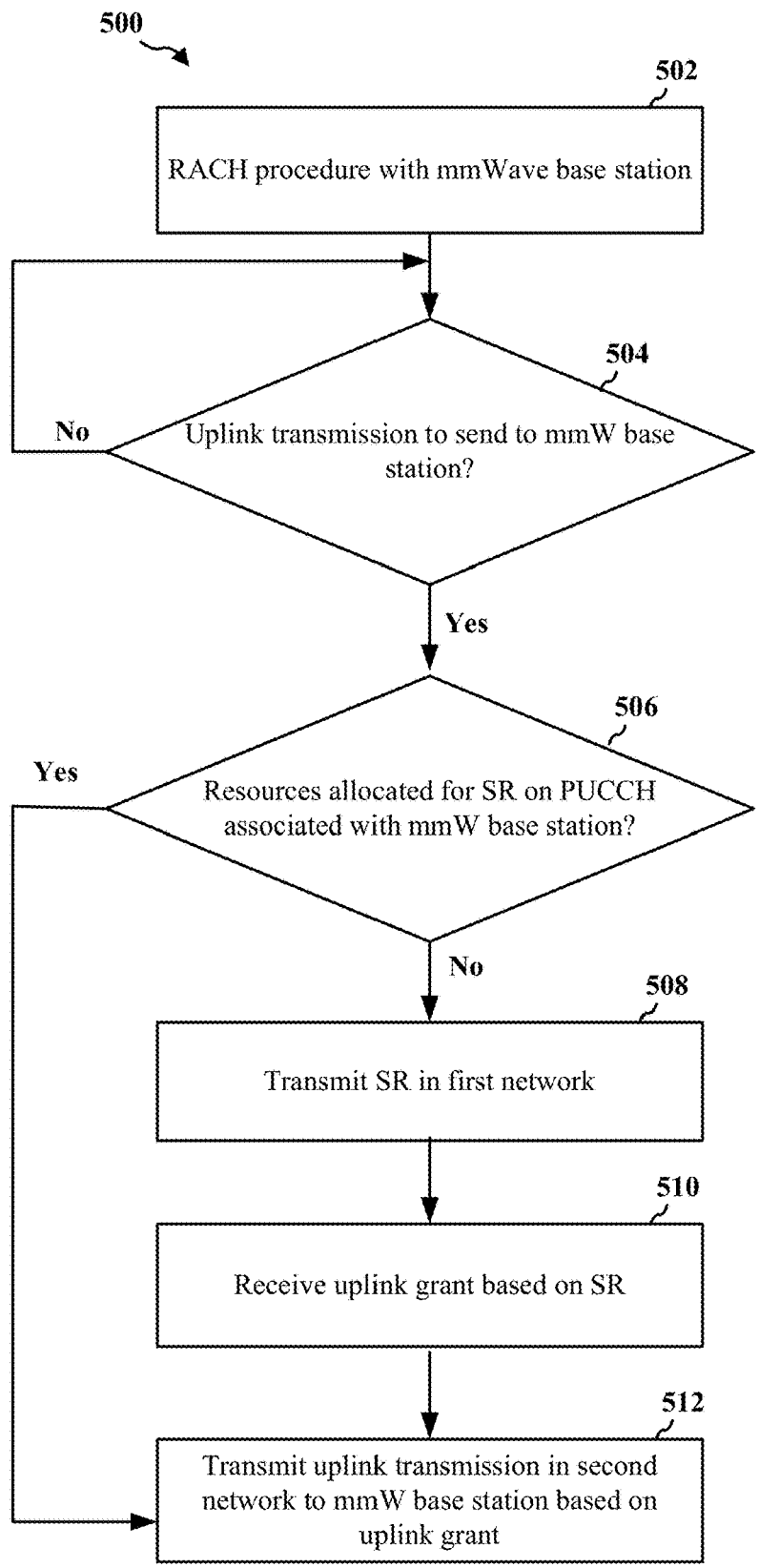
FIG. 5 is a flowchart of a method of wireless communication.

FIG. 5 is a flowchart illustrating a method 500 of wireless communication by a UE. In an aspect, the method 500 may be performed by the UE 402 of FIG. 4. Although the method 500 illustrates a plurality of operations, it will be appreciated that one or more operations may be omitted from the method 500. Additionally, one or more operations of the method 500 may be transposed and/or contemporaneously performed.

Beginning first with operation 502, the UE may perform a random access (RACH) procedure with a mmW base station. In the context of FIG. 4, the UE 402 may perform a RACH procedure with the mmW base station 404.

At operation 504, the UE may determine if the UE has an uplink transmission to send to the mmW base station in a mmW network. Operation 504 may not be performed immediately after operation 502, e.g., the UE may cycle through one or more DRX cycles and may not be considered active with respect to the mmW base station. In one aspect of operation 504, the UE may generate an SR associated with the uplink transmission in the mmW network. For example, the UE may determine that the UE has an uplink transmission to transmit but does not have an uplink grant. In the context of FIG. 4, the UE 402 may determine if the UE 402 has an uplink transmission to send to the mmW base station 404 in the second network.

At operation 506, the UE may determine if the UE has resources allocated for an SR on the PUCCH associated with the mmW base station. For example, if the UE is considered inactive, the UE may lack resources on the PUCCH associated with the mmW base station because, in mmW systems, PUCCH resources may be dynamically allocated to active UEs and not inactive UEs. Thus, the UE may determine that the UE is to send an SR in order to transmit the uplink transmission, but the UE lacks resources of the PUCCH associated with the mmW base station on which to transmit (e.g., the UE may lack resources on which to transmit the SR). In the context of FIG. 4, the UE 402 may determine whether the UE has resources allocated for an SR on the PUCCH associated with the mmW base station 404.

If the UE lacks resources on the PUCCH associated with the mmW base station, the UE may proceed to operation 508. At operation 508, the UE may transmit the SR in another network, different from the mmW network in which the UE may transmit the uplink transmission to the mmW base station. In one aspect, the UE may transmit the SR in an LTE network. In another aspect, the UE may transmit the SR in a 5G network that operates at sub-6 GHz. In one aspect, the UE may transmit the SR to a base station that is different from the mmW base station (e.g., an eNB). In the context of FIG. 4, the UE 402 may transmit the SR 420 to the eNB 414 in the first network.

At operation 510, the UE may receive an uplink grant based on the SR. In one aspect, the UE may receive the uplink grant in the mmW network. In one aspect, the UE may receive the uplink grant from the mmW base station. In the context of FIG. 4, the UE 402 may receive the uplink grant 424 in the second network from the mmW base station 404.

At operation 512, the UE may transmit the uplink transmission to the mmW base station based on the uplink grant. In an aspect, the UE may transmit the uplink transmission in the mmW network. In the context of FIG. 4, the UE 402 may transmit, based on the uplink grant 424, the uplink transmission 426 to the mmW base station 404 in the second network.

Figure 6:
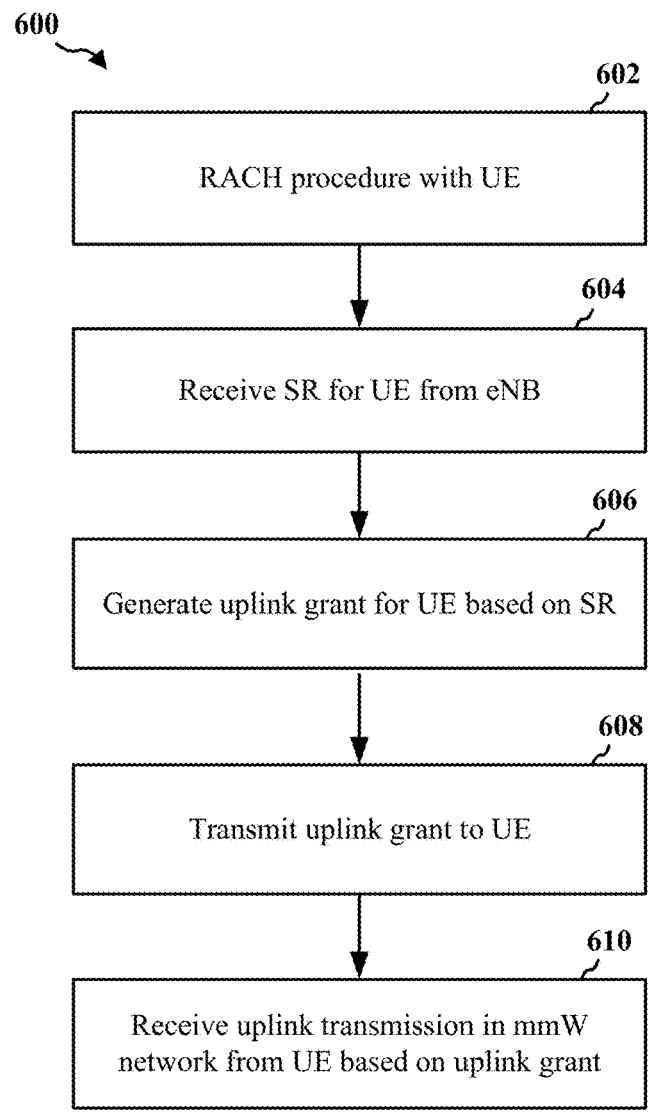
FIG. 6 is a flowchart of a method of wireless communication.

FIG. 6 is a flowchart illustrating a method 600 of wireless communication by a base station. In an aspect, the method 600 may be performed by the mmW base station 404 and/or the eNB 414 of FIG. 4. Although the method 600 illustrates a plurality of operations, it will be appreciated that one or more operations may be omitted from the method 600. Additionally, one or more operations of the method 600 may be transposed and/or contemporaneously performed.

Beginning first with operation 602, the mmW base station may perform a RACH procedure with a UE. In the context of FIG. 4, the mmW base station 404 may perform a RACH procedure with the UE 402.

In various aspects of mmW systems, the mmW base station may not allocate resources for UEs that are inactive. For example, the mmW base station may dynamically allocate PUCCH resources to active UEs and, therefore, some inactive UEs may need to send an SR to the mmW base station but lack resources on the PUCCH to transmit the SR. Consequently, while the mmW base station and the UE may have performed a RACH procedure, the mmW base station may not have allocated resources on a PUCCH for that UE to send an SR.

At operation 604, the mmW base station may receive an SR associated with the UE. In an aspect, the mmW base station may receive the SR in a different network than the mmW network. For example, the SR may be received through an LTE or 5G network, but the SR may be associated with a mmW (or near mmW) network. In an aspect, the mmW base station may receive the SR from another device, different from the UE, such as a base station or eNB. In the context of FIG. 4, the mmW base station 404 may receive the SR information 422 for the UE 402 from the eNB 414.

At operation 606, the mmW base station may generate an uplink grant for the UE in the mmW network based on the SR. In an aspect, the mmW base station may allocate and/or schedule resources for the UE to transmit an uplink transmission to the mmW base station. In the context of FIG. 4, the mmW base station 404 may generate an uplink grant for the UE 402 based on the SR information 422.

At operation 608, the mmW base station may transmit the uplink grant to the UE. In an aspect, the mmW base station may transmit the uplink grant to the UE in the mmW network. In the context of FIG. 4, the mmW base station 404 may transmit the uplink grant 424 in the second network to the UE 402.

At operation 610, the mmW base station may receive an uplink transmission in the mmW network from the UE based on the uplink grant. In the context of FIG. 4, the mmW base station 404 may receive the uplink transmission 426 in the second network from the UE 402.

Figure 7:
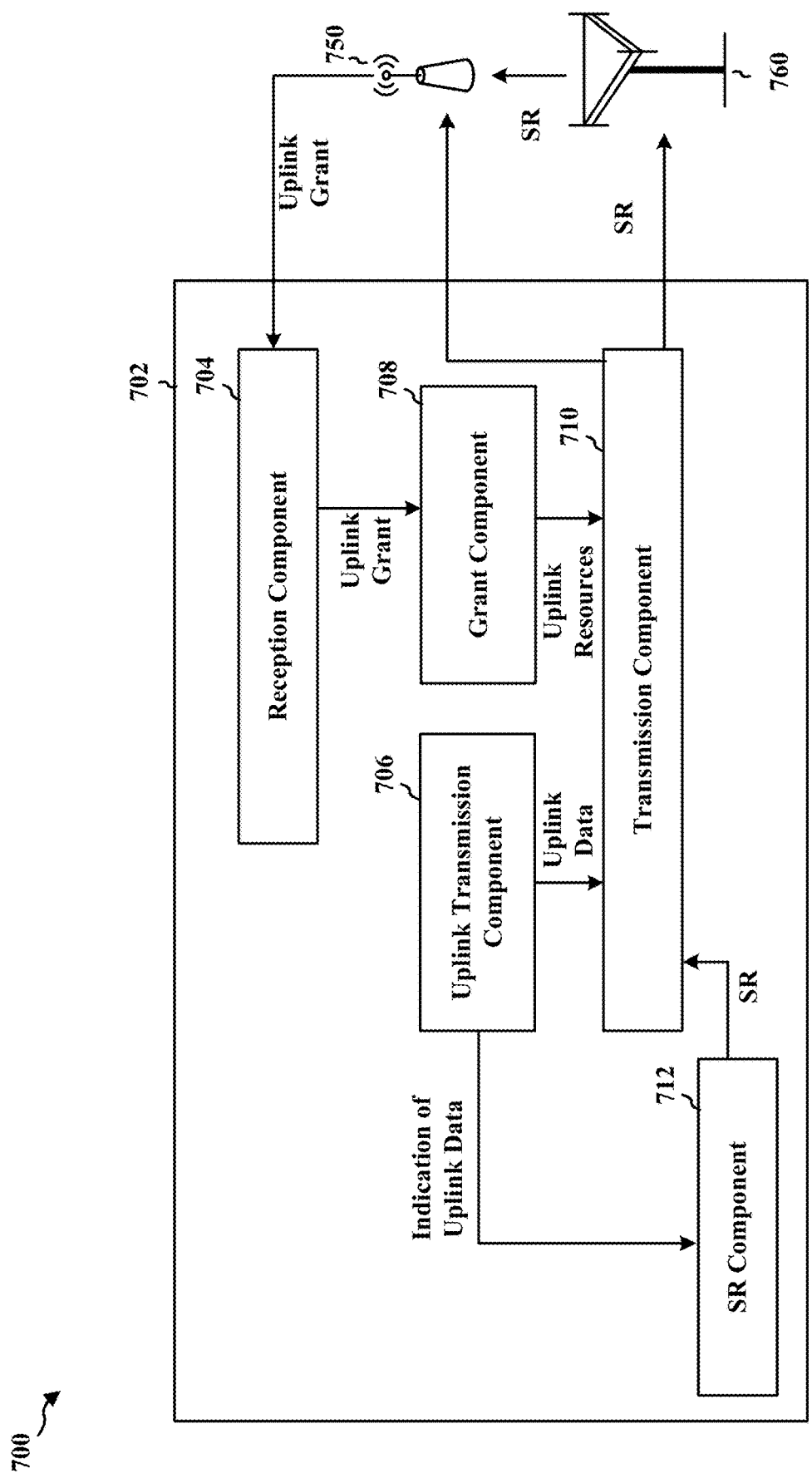
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE, such as the UE 402.

The apparatus 702 may include a reception component 704 configured to receive signals from a mmW base station 750 and/or an eNB 760. The apparatus 702 may include a transmission component 710 configured to transmit signals to the mmW base station 750 and/or the eNB 760. The reception component 704 and/or the transmission component 710 may be configured to operate in both a first network (e.g., an LTE or 5G network) and a second network (e.g., a mmW or near-mmW network).

In an aspect, the apparatus 702 may include an uplink transmission component 706. The uplink transmission component 706 may determine an uplink transmission to be transmitted to the mmW base station 750. However, the apparatus 702 may lack resources to transmit the uplink transmission. For example, the apparatus 702 may be considered inactive.

In an aspect, the uplink transmission component 706 may provide an indication of an uplink transmission that is to be transmitted in the second network. The SR component 712 may generate an SR based on the uplink transmission that is to be transmitted in the second network. The SR component 712 may provide the SR to the transmission component 710. The transmission component 710 may send, in the first network to the eNB 760, the SR.

The eNB 760 may provide the SR to the mmW base station 750. The mmW base station 750 may allocate resource(s) for the apparatus 702. Accordingly, the mmW base station 750 may transmit an uplink grant based on the SR. While the uplink grant may be associated with the second network, the reception component 704 may receive the uplink grant in either the first network or the second network.

The grant component 708 may receive the uplink grant through the reception component 704. The uplink grant may indicate resource(s) on which the apparatus 702 may transmit in the second network. The grant component 708 may determine uplink resources that are to carry data in the second network and provide an indication thereof to the transmission component 710.

The transmission component 710 may receive an uplink transmission to be transmitted in the second network from the uplink transmission component 706. The transmission component may send, in the second network, the uplink transmission based on the uplink grant (e.g., based on the uplink resources indicated by the grant component 708).

The apparatus may include additional components that perform each of the blocks of the algorithm in the aforementioned flowcharts of FIG. 5. As such, each block in the aforementioned flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
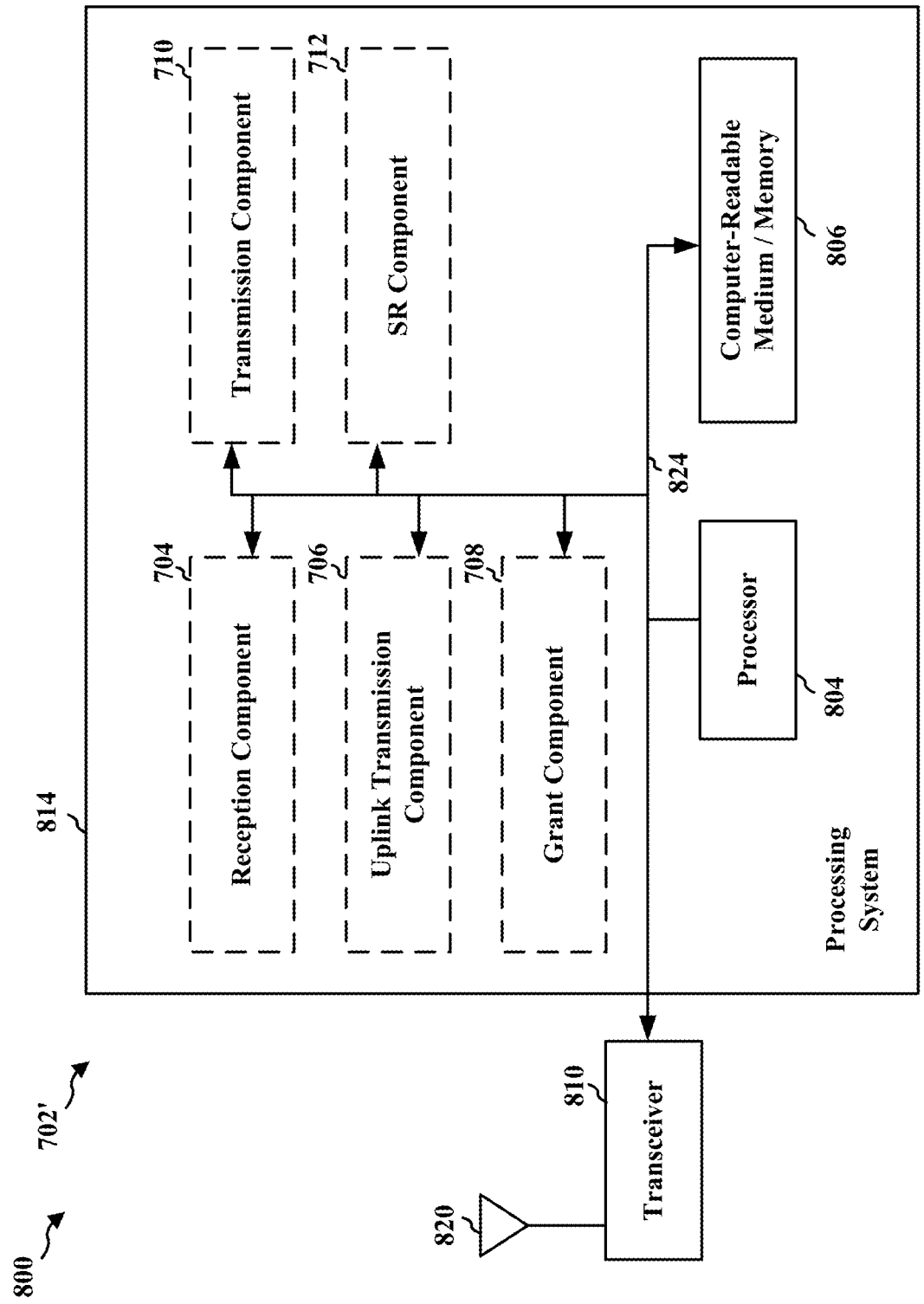
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

The apparatus 702/702' may be a UE. In one configuration, the apparatus 702/702' for wireless communication includes means for sending, in a first network, a SR associated with a second network. The apparatus 702/702' may further include means for receiving an uplink grant based on the SR. The apparatus 702/702' may further include means for sending, in the second network, an uplink transmission based on the uplink grant.

In an aspect, the uplink grant is received in the second network. In an aspect, the second network includes a mmW network. In an aspect, the first network includes an LTE network. In an aspect, the first network includes a fifth generation (5G) network operating at sub-6 GHz. In an aspect, the apparatus 702/702' is an inactive UE. In an aspect, uplink control resources associated with the second network are dynamically allocated and the apparatus 702/702' lacks allocated uplink control resources. In an aspect, the means for sending the SR is configured to send the SR to a first base station and means for sending the uplink transmission is configured to send the uplink transmission to a second base station.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
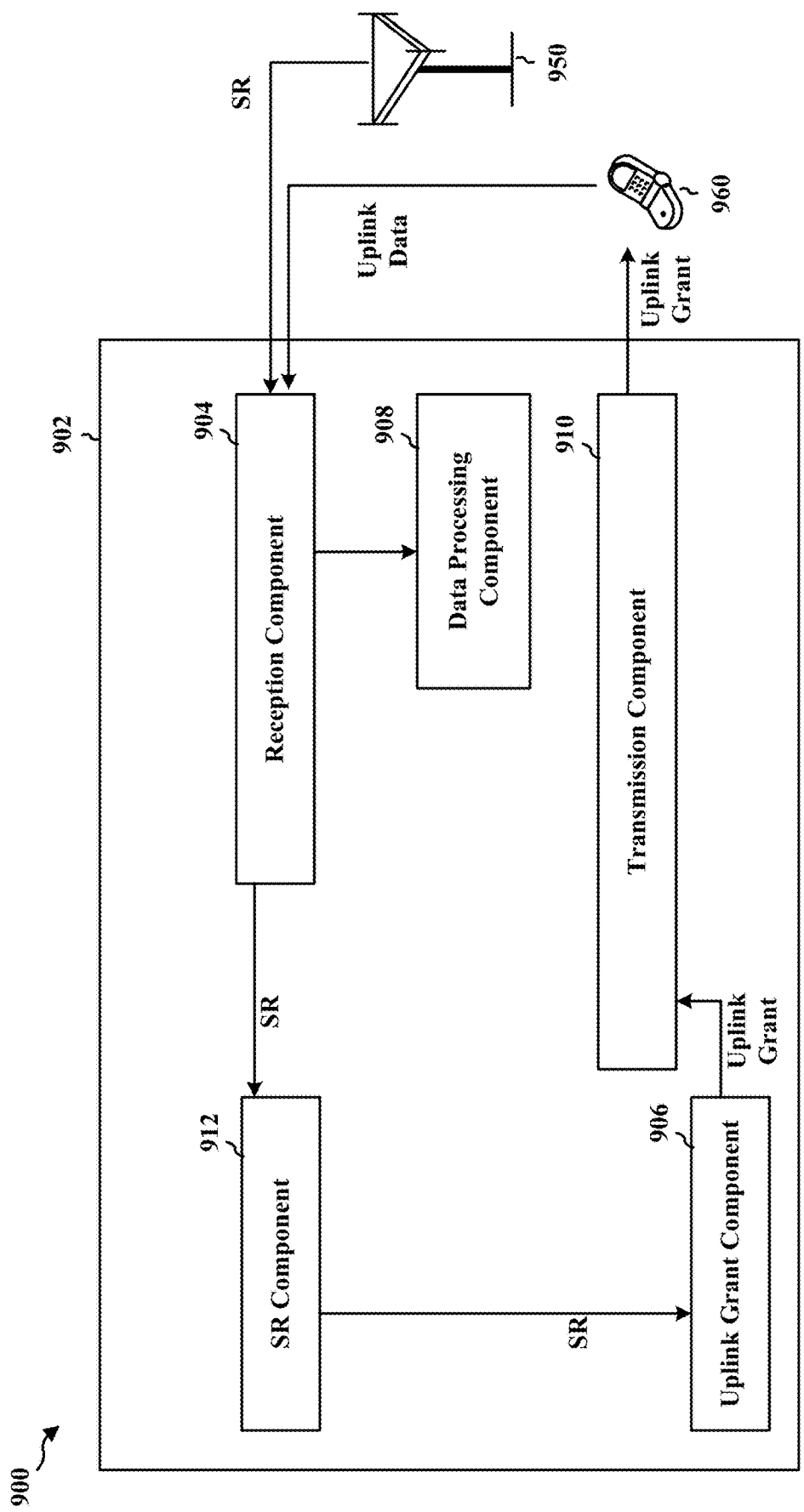
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a base station. In one aspect, the apparatus 902 may be collocated with an eNB 950.

The apparatus 902 may include a reception component 904 configured to receive signals from the eNB 950 and/or a UE 960. The apparatus 902 may include a transmission component 910 configured to transmit signals to the eNB 950 and/or the UE 960. The reception component 904 and/or the transmission component 910 may be configured to operate in both a first network (e.g., an LTE or 5G network) and a second network (e.g., a mmW or near-mmW network).

In an aspect, the UE 960 may be inactive. For example, uplink control resources associated with the second network may be dynamically allocated to the UE 960 and the UE 960 may lack allocated uplink control resources with respect to the apparatus 902.

In an aspect, the SR component 912 may be configured to receive, in the first network, an SR associated with the UE 960. The SR may be associated with the second network. In an aspect, the SR may be received from the eNB 950.

The SR component 912 may provide the SR to an uplink grant component 906. The uplink grant component 906 may be configured to allocate resources for an uplink transmission from the UE 960 in the second network. The uplink grant component 906 may generate an uplink grant based on the SR, and the uplink grant may indicate an allocation of resources for the UE 960 in the second network. The uplink grant component 906 may cause the transmission component 910 to transmit the uplink grant to the UE 960. The uplink grant may be transmitted in the second network.

Based on the uplink grant, the UE 960 may transmit an uplink transmission to the apparatus 902. The data processing component 908 may receive, through the reception component 904, the uplink transmission in the second network based on the uplink grant.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
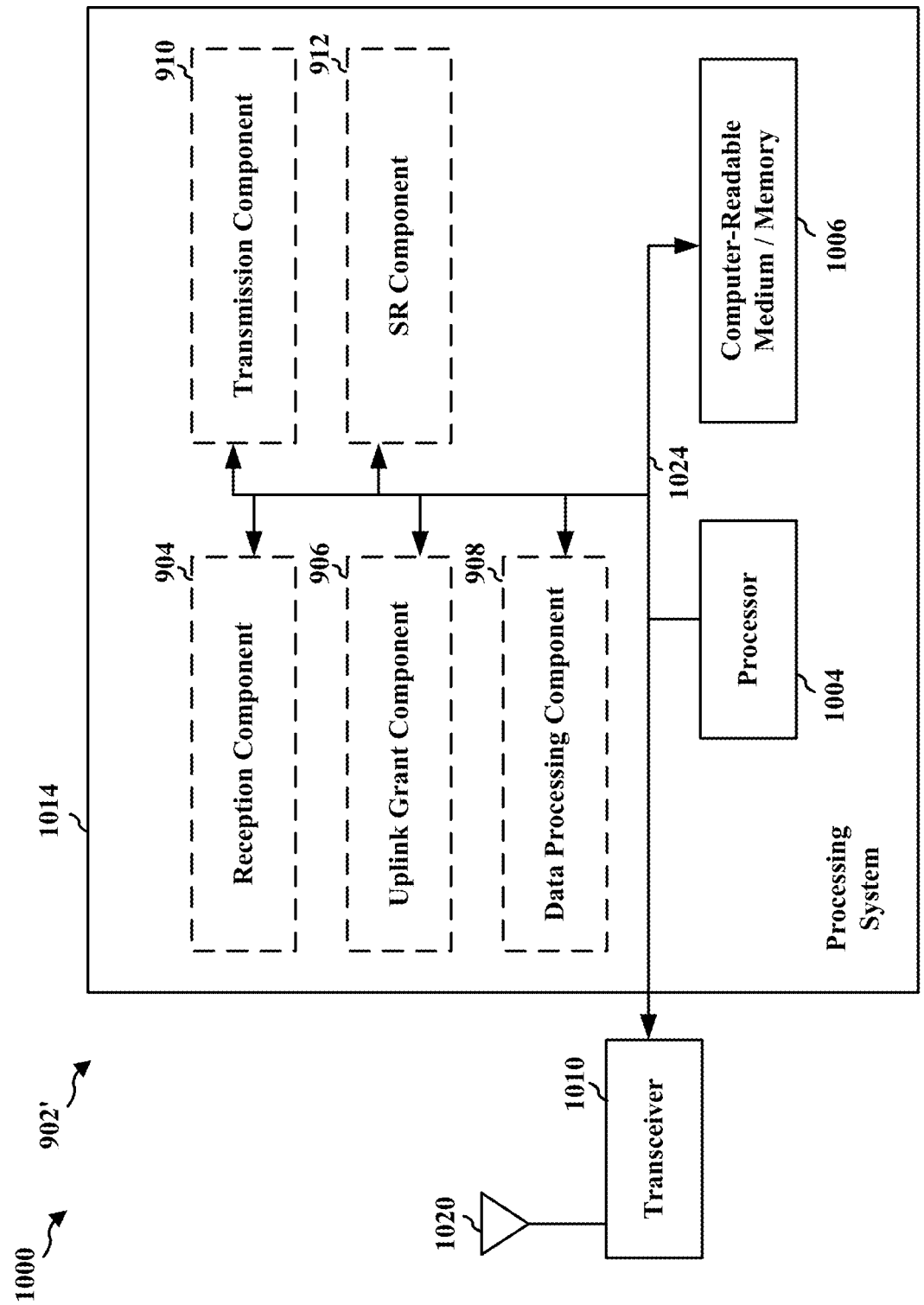
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375.

The apparatus 902/902' may include a mmW base station. In one configuration, the apparatus 902/902' for wireless communication includes means for means for receiving, in a first network, a SR associated with a UE. The apparatus 902/902' may further include means for generating an uplink grant based on the SR. apparatus 902/902' may further include means for sending, in a second network, the uplink grant to the UE.

In an aspect, the SR is received from an eNB. In an aspect, the second network includes a mmW network. In an aspect, the first network includes an LTE network or includes a fifth generation (5G) network operating at sub-6 GHz. In an aspect, uplink control resources associated with the second network are dynamically allocated and the UE lacks allocated uplink control resources. In an aspect, the apparatus 902/902' is collocated with a base station configured to communicate in the first network.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), the method comprising:
    sending to a first base station in a first network, a scheduling request (SR) associated with a second network having a second base station with dynamically allocated resources for which the UE lacks allocated uplink control resources, the first network having a lower frequency than the second network;
    receiving an uplink grant based on the SR; and
    sending, in the second network, an uplink transmission based on the uplink grant.

2. The method of claim 1, wherein the uplink grant is received in the second network.

3. The method of claim 1, wherein the second network includes a millimeter wave (mmW) network.

4. The method of claim 1, wherein the first network includes a Long Term Evolution (LTE) network.

5. The method of claim 1, wherein the first network includes a fifth generation (5G) network operating at sub-6 Gigahertz (GHz).

6. The method of claim 1, wherein the UE is an inactive UE.

7. The method of claim 1 wherein the first base station and the second base station are the same base station.

8. The method of claim 1 wherein the first base station and the second base station are collocated.

9. A user equipment (UE), the UE comprising:
   means for sending to a first base station in a first network, a scheduling request (SR) associated with a second network having a second base station with dynamically allocated resources for which the UE lacks allocated uplink control resources, the first network having a lower frequency than the second network;
   means for receiving an uplink grant based on the SR; and
   means for sending, in the second network, an uplink transmission based on the uplink grant.

10. The UE of claim 9, wherein the uplink grant is received in the second network.

11. The UE of claim 9, wherein the second network includes a millimeter wave (mmW) network.

12. The UE of claim 9, wherein the first network includes a Long Term Evolution (LTE) network.

13. The UE of claim 9, wherein the first network includes a fifth generation (5G) network operating at sub-6 Gigahertz (GHz).

14. The UE of claim 9, wherein the UE is an inactive UE.

15. The user equipment of claim 9 wherein the first base station and the second base station are the same base station.

16. The user equipment of claim 9 wherein the first base station and the second base station are collocated.

17. A method of wireless communication for a millimeter wave (mmW) base station, the method comprising:
   receiving, in a first network having a first base station, a scheduling request (SR) associated with a user equipment (UE);
   generating an uplink grant based on the SR; and
   sending, in a second network having a second base station with dynamically allocated resources and collocated with the first base station, the uplink grant to the UE, the first network having a lower frequency than the second network.

18. The method of claim 17, wherein the SR is received from an evolved Node B (eNB).

19. The method of claim 17, wherein the second network includes a millimeter wave (mmW) network.

20. The method of claim 17, wherein the first network includes a Long Term Evolution (LTE) network.

21. The method of claim 17, wherein the first network includes a fifth generation (5G) network operating at sub-6 Gigahertz (GHz).

22. The method of claim 17, wherein the UE is an inactive UE.

23. The method of claim 17 wherein the first base station and the second base station are the same base station.

24. A millimeter wave (mmW) base station, the mmW base station comprising:
   means for receiving, in a first network, a scheduling request (SR) associated with a user equipment (UE);
   means for generating an uplink grant based on the SR; and
   means for sending, in a second network having dynamically allocated resources and collocated with the first base station, the uplink grant to the UE, the first network having a lower frequency than the second network.

25. The mmW base station of claim 24, wherein the SR is received from an evolved Node B (eNB).

26. The mmW base station of claim 24, wherein the second network includes a millimeter wave (mmW) network.

27. The mmW base station of claim 24, wherein the first network includes a Long Term Evolution (LTE) network or includes a fifth generation (5G) network operating at sub-6 Gigahertz (GHz).

28. The millimeter wave (mmW) base station of claim 24 wherein the first base station and the second base station are the same base station.

* * * * *